United States Patent [19]

Moorman et al.

[11] Patent Number: 5,319,014

[45] Date of Patent: Jun. 7, 1994

[54] HIGHLY FILLED, POLYMERISABLE COMPOSITIONS

[75] Inventors: Geraldine A. Moorman, Leyland; Michael D. Taylor, Great Barrow; Nicholas J. Walton, Frodsham, all of England

[73] Assignee: Imperial Chemical Industries PLC, England

[21] Appl. No.: 882,872

[22] Filed: May 14, 1992

[30] Foreign Application Priority Data

May 20, 1991 [GB] United Kingdom ............... 9110883

[51] Int. Cl.$^5$ ..................... C08J 3/20; C08F 222/16
[52] U.S. Cl. ................. 524/427; 524/444; 524/445; 524/447; 523/115; 523/116; 523/117
[58] Field of Search ............... 524/427, 444, 447; 523/115, 116, 117

[56] References Cited

U.S. PATENT DOCUMENTS

| | | | |
|---|---|---|---|
| 3,825,518 | 7/1974 | Foster et al. | 523/116 |
| 4,128,528 | 12/1978 | Frisque et al. | 524/447 |
| 4,221,697 | 9/1980 | Osborn et al. | 524/853 |
| 4,251,576 | 2/1981 | Osborn et al. | 524/766 |
| 4,297,266 | 10/1981 | Ibsen et al. | 523/115 |
| 4,433,958 | 2/1984 | Fellman et al. | 523/115 |
| 4,472,538 | 9/1984 | Kamigaito et al. | 524/445 |
| 4,649,165 | 3/1987 | Kuhlmann | 523/117 |
| 4,670,480 | 6/1987 | Moorrone | 523/116 |
| 4,713,403 | 12/1987 | Yoshida et al. | 523/116 |

FOREIGN PATENT DOCUMENTS 0262784  4/1988  European Pat. Off. ....... C08F 2/44

Primary Examiner—Paul R. Michl
Assistant Examiner—Olga Asinovsky
Attorney, Agent, or Firm—Cushman, Darby & Cushman

[57] ABSTRACT

A fluid, highly filled, curable composition comprising an organic liquid which is polymerisable to form a solid polymer without the formation of elimination products and which is based on methyl methacrylate, 20 to 70% by volume of finely divided inorganic filler particles, at least 1% by volume of these being in the form of particles having a diameter of at least 30 microns, with the proviso that when the maximum particle size of such particles is 150 microns they are present at a concentration of between 20% and 70% by volume and when particles are present having a size of greater than 150 micron they are present at a concentration of at least 1% but preferably not exceeding 30% by volume and from 0.05 to 5.0% by weight of the total composition, of an organophilic, surface modified clay having a particle surface area of at least 100 m$^2$/g.

The composition has viscosity characteristics which enable the composition to be readily pumped into moulds using low pressure equipment but which at the same time enables the large filler particles to be kept uniformly dispersed during the curing of a moulding.

10 Claims, No Drawings

HIGHLY FILLED, POLYMERISABLE COMPOSITIONS

This invention relates to fluid, curable compositions containing a high volume concentration of particulate filler material.

British Patent Specification No. 1 493 393 describes highly filled, curable compositions containing at least 20% by volume of finely divided filler particles dispersed in a polymerisable organic liquid wherein the maximum size of any particle present is 100 microns, at least 95% by number of the particles are of a size 10 microns or less, and the particles have a surface area of from 30 $m^2/cc$ to 1 $m^2/cc$, preferably from 20 $m^2/cc$ to 2 $m^2/cc$, as determined by the B.E.T. nitrogen absorption method. The compositions also contain a polymeric dispersant defined as an amphipathic substance containing (a) at least one chain-like component of molecular weight at least 500 which is solvated by the polymerisable organic liquid and is also solvated by, or is compatible with, the oligomeric or polymeric products which result throughout the course of the curing operation from the polymerisable organic liquid, and (b) one or more groupings which are capable of associating with, and effecting anchoring to the particles of the inorganic filler.

The presence of the polymeric dispersant enables the production of dispersions having a filler content of 50% by volume or more whilst also having a fluid viscosity so low that the dispersion may be readily pumped for handling purposes. The low viscosity makes the dispersions ideally suited to fabrication into shaped articles using inexpensive, low pressure moulds. Despite the low viscosity of the composition the polymeric dispersant enables the filler particles to remain suspended during the polymerisation process without significant sedimentation. Although the filler particles will eventually sediment on storage of the dispersion, the polymeric dispersant keeps the particles in a state of stable deflocculation so that they can be redispersed, even after settling to form a cake, by mild agitation.

Although the compositions of GB 1 493 393 have proved to be extremely useful in providing the fabricator with an easy to handle material which can be moulded in inexpensive moulds, the compositions have the limitation that sedimentation problems arise when there is a need to provide compositions containing a significant amount of large filler particles.

Such a need may arise when it is necessary to produce a dispersion which gives increased visual translucency of the polymerised article or improved fracture toughness/crack resistance. A marked tendency to sediment is a significant problem when moulding flat sheets or shaped articles for example vanity bowls, sinks, countertops. In compositions with a mean particle size of at least 30 $\mu$m, sedimentation can result in poor surface finish of the moulded item due to high concentrations of filler at the surface. This sedimentation can also give rise to warpage of the article on demoulding due to differences in thermal expansion behaviour between low and high filler content regions.

It is also advantageous to inhibit particle sedimentation in compositions where a proportion of very large filler particles of a size greater than 150 $\mu$m in one dimension have been included to achieve a special effect, such as a granite effect. In compositions containing such large particles, sedimentation rates can vary between different regions of the mould cavity. This leads to concentration differences of the large particles across the surface of the article and through the cross-section and gives rise to a variable colour effect. There is consequently, a need for a dispersion which has all the benefits of the dispersions of GB 1 493 393 but which also enables larger particles to remain suspended at least over the time required to polymerise the composition.

Accordingly there is provided a fluid, highly filled, curable composition comprising an organic liquid which is polymerisable to form a solid polymer without the formation of elimination products and in which methyl methacrylate comprises at least 15% by weight, preferably at least 25% by weight of the organic liquid, 20 to 70% by volume of finely divided inorganic filler particles, at least 1% by volume of these being in the form of particles having a diameter of at least 30 microns, with the proviso that when the maximum particle size of such particles is 150 microns they are present at a concentration of between 20% and 70% by volume and when particles are present having a size of greater than 150 micron they are present at a concentration of at least 1% but preferably not exceeding 30% by volume and from 0.05 to 5.0% by weight preferably 0.1 to 2.0% by weight, of the total composition, of an organophilic, surface modified clay having a particle surface area of at least 100 $m^2/g$, preferably greater than 400 $m^2/g$.

By "organic liquid which is polymerisable to form a solid polymer" is meant (a) a liquid monomer which can be polymerised to form a solid polymer in which the repeat units of the polymer chain are linked through carbon-carbon bonds or by such bonds interrupted by hetero atoms, the polymerisation preferably taking place without the formation of an elimination product or (b) a mixture of liquid monomer as described in (a) and one or more polymers soluble in component (a) and either compatible or incompatible with polymer produced from the polymerisation of component (a).

With the proviso that at least 15% by weight of the organic liquid should comprise methyl methacrylate, the liquid component (a) may be chosen from a wide variety of ethylenically unsaturated monomers. The esters of acrylic and methacrylic acids with alcohols containing 1 to 18 carbon atoms are preferred.

It is advantageous if the final matrix polymer is a cross-linked polymer or a polymer which is highly branched to the extent of being unprocessable by heat and/or pressure. This may be achieved by the inclusion in polymeric liquid (a) of a proportion of a polyethylenically unsaturated monomer or oligomer copolymerisable with component (a). Of particular interest are final matrix polymers derived from oligourethane acrylates or methacrylates, optionally containing a reactive diluent such as methyl methacrylate, providing that at least 15% by weight of the cured product consists of repeat units of an acrylate or methacrylate monomer. Suitable polymerisable compositions are described in European Patent Publications 64809 and 151990.

Where the curable compositions used do not give rise to cross-linked products in their own right, for example, where the curable liquid is methyl methacrylate, it is advantageous to include a polyfunctional curable material to obtain a cured article in which the matrix polymer is cross-linked.

Whatever curable system or combination of materials is used it is preferred that the fluid material of the composition contains a major proportion of methyl methacrylate.

For ease of fabrication the curable composition should have a sufficiently low fluidity to be readily pumpable because it is desirable that the composition be capable of being rapidly introduced into the moulds into which the shaped articles are to be produced.

In order to fulfill the dual requirement that the composition is sufficiently fluid to be able to be readily pumpable into moulds using low pressure equipment and that the large particles present are maintained in a state of substantially uniform dispersion within the composition at least over the period required to polymerise the composition, it is necessary that the composition has appropriate viscosity characteristics. The composition should have shear thinning characteristics i.e. exhibit high viscosity under low or zero shear conditions and show a reduction in viscosity as shear is increased. An appropriate test for such performance is the relative shear thinning, which is termed "thixotropy index" in this specification, which is determined as a ratio of the viscosities measured at ambient temperature on a Brookfield viscometer using Spindle No. 3 at 6 rpm and 30 rpm respectively. In preferred compositions the viscosity measured at 30 rpm on Spindle 3 is less than 250 Poise, desirably between 15 and 70 Poise, but at least 5 Poise. The thixotropy index should be at least 1.1, preferably at least 2.0 and is generally less than 4.

Where the composition does not consist substantially wholly of particles having a diameter of greater than 30 microns the remaining particles may be much finer, for example, as described in GB 1 493 393.

The inorganic filler is characteristically a solid material having a high elastic shear modulus, namely a modulus of not less than 5 $GN/m^2$ and preferably not less than 10 $GN/m^2$ Alternatively, suitable solid materials may be defined as those having a Knoop hardness of greater than 100. Examples of suitable solids include a wide variety of minerals such as aluminas, including alumina trihydrate, forms of silica such as quartz, cristobalite and tridymite, kaolin and its calcination products, feldspar, kyanite, olivine, nepheline, syenite, sillimanite, zircon, wollastonite, apatite, aragonite, calcite, magnesite, barytes, gypsum and other metal silicates, aluminates, aluminosilicates, phosphates, sulphates, carbonates, sulphides, carbides and oxides; metals, which may be either brittle or ductile, such as cast iron, zinc alloys, aluminium, bronze and steel; and artificial materials such as glasses, porcelain, slag ash and forms of carbon such as coke.

The particles of the inorganic filler may have broad or narrow size distributions and these may be either monomodal or polymodal within the stated size ranges. The particle size of the filler refers to the largest dimensions of the particles, which may vary from being granular to being plate-like, cylindrical or rod-like, or oblong in shape. It is preferred that the majority of the particles be generally granular in shape as opposed to plate- or rod-like, since the stiffness of composite materials made from the curable compositions and the ease of fabrication of the latter into composite materials are optimised thereby. However, for special applications, particles with length-to-diameter or length-to-thickness ratios not greater than 25:1, for example certain particles of asbestos, wollastonite, silicon carbide or silicon nitride "whiskers," kaolin or aluminium or mica platelets, may be employed.

Where the filler particles having a diameter of at least 30 microns comprise the major filler component, that is at a concentration of greater than about 50% by weight of the total filler content, it is preferred that they are essentially granular in nature, as opposed to rod-like or plate-like, and have a maximum diameter of 150 microns, preferably not more than 90 microns. Preferred fillers have a mean diameter between 35 and 65 microns. Where the filler particles are present to provide special aesthetic effects they should be present as larger size particles having a minimum size of at least 150 micron in the largest dimension. Plate-like fillers are particularly suitable for obtaining special aesthetic effects. Whilst these may be present at a concentration as low as 1% by volume of the composition and preferably less than 30% by volume, they may be present at higher concentration. Whereas when present at a concentration of between 1 and 30% by volume the composition will additionally contain particles less than 150 micron in size, the composition may consist wholly of larger particles. For example, the composition may contain up to 50% by volume of very large particles which are of sizes in the range 0.15 to 2 mm.

The compositions may include any of the polymeric dispersants described in GB 1 493 393.

The polymeric dispersants disclosed therein are materials containing (a) at least one chain-like component of molecular weight at least 500 which is solvated by the polymerisable organic liquid and is also solvated by, or is compatible with, the oligomeric or polymeric products which result throughout the course of the curing operation from the polymerisable organic liquid, and (b) one or more groupings which are capable of associating with, and effecting anchoring to the particles of the inorganic filler. Other dispersants, whether polymeric or not, may be also used to assist in dispersing the fillers. These dispersants may be formed in situ during the preparation of the fluid composition.

The organophilic surface modified clays are naturally occurring layer minerals which have been given a surface treatment to improve their dispersibility in a liquid carrier. The preferred layer minerals are those having a significant layer charge resulting from the presence of cations within the layers and on the faces and edges of the layer minerals. These cations give rise to an exchange capacity enabling organophilic chains to be grafted onto the layer mineral by cation exchange. This exchange capacity enabling organophilic chains to be grafted onto the layer mineral by cation exchange. This exchange is typically achieved using primary or tertiary amines of sufficient chain length to provide organophilicity. Generally, a chain length of at least 8 carbon atoms is required, to produce a material of significant organophilicity although longer chain lengths will be required if the exchange capacity of the layer mineral is low and chain lengths of at least 12 carbon atoms are preferred. The chemistry of these processes are discussed in the book "Clay Mineralogy" 2nd Edition, 1968 by Ralph E Grim (McGraw Hill Book Co Inc) particularly Chapter 10.

Such organophilic layer minerals are readily available as commercial products. Layer mineral organoclay complexes formed by the reaction of a high molecular weight organic cation with a highly refined layer mineral (for example bentonite or hectorite), such as organophilic bentonite are now available from Laporte.

In the case of compositions where the organic polymerisable liquid is based on methyl methacrylate, a particularly satisfactory modified clay has been found to be Claytone PS-2, supplied by EEC International Ltd, now available from Laporte. This is a bentonite which has been surface modified to ion exchange about 40% of the cation sites to provide organophilic moieties of stearyl and benzyl stearyl groups on the surface. The average particle size of this material (based on an equivalent spherical diameter, since it is a plate-like material) is about 0.2 microns. The surface area as measured by the BET absorption method is about 700 m$^2$/g.

In preferred clays at least 50% by weight of the organophilic moieties are provided by aliphatic groups.

In order to maximise the properties of the composition it is sometimes useful that in certain applications some bonding between the polymer matrix and the particles is achieved by the inclusion of a bonding agent of the type which contains one or more groups capable of interacting or associating with groups in the inorganic material, and also one or more groups which can copolymerise with, or otherwise graft on to, the polymer forming the matrix in the finished composite material.

Suitable bonding agents are, in general, substances containing groups which can form a multiplicity of ionic, covalent or hydrogen bonds with the particle, and also groups which can react to form bonds with the polymer matrix. Suitable groups for bonding to ATH particles are, for example, the oligomeric hydrolysis products of alkoxy silanes, chlorosilanes and alkyl titanates as well as the trivalent chromium complexes or organic acids.

Groups suitable for bringing about bonding with the polymer matrix are typically those which co-react with the polymerisable liquid during the polymerisation stage. Thus an interfacial bonding agent containing an ethylenically unsaturated group is suitable for use with addition polymerisation systems involving vinyl, vinylidene and similar unsaturated monomers. An agent containing an amino, an oxirane or a carboxyl group is suitable for use with epoxy-group-containing compounds. Examples of suitable interacial bonding agents include:

γ-methacryloxypropyl trimethoxy silane
γ-aminopropyl trimethoxysilane
γ-glycidyloxypropyl trimethoxysilane
vinyl triethoxysilane
vinyl triacetoxysilane
vinyl trichlorosilane
Acrylic and methacrylic acids and their metal salts
Methacrylatochromic chloride
Maleimidopropionic acid
Succinimidopropionic acid
4-Ammonimethylpiperidine
Tetraisopropyl and tetrabutyl titanates The amounts of the interfacial bonding agent used are, in general, those conventional in the art of polymeric materials reinforced with inorganic fillers. A usage of 0.001 g of bonding agent per square meter of filler particle surface area is typical. If desired, a mixture of two or more interfacial bonding agents of the types described may be used.

The curable compositions of the invention may incorporate dyestuffs or pigments. These constituents may be dissolved or dispersed in the complete mixture of the polymerisable liquid, the finely divided inorganic filler and the polymeric dispersant, or, in the case of pigments, they may be added to that mixture as a preformed dispersion in the polymerisable liquid which has been prepared with the aid of a suitable pigment dispersant.

The curing of the curable compositions in the mould will be effected by methods known to those skilled in the art. For example, an addition polymerisable material will be polymerised using a free radical initiator chosen from those known to be effective for such purposes. The initiator chosen will depend on the polymerisation conditions to be employed but it is generally preferred to use mould temperatures of at least 50° C. to achieve rapid polymerisation cycles. Suitable free radical initiators under these conditions are benzoyl peroxide, azodiisobutyronitrile and bis(4-tertbutyl cyclohexyl) peroxydicarbonate.

The invention is further described with reference to the following examples.

Example 1

A curable composition was made up by dispersing 63 parts by weight of alumina trihydrate (Alcoa grade C33) having a mean particle size of 55 microns in 34 parts of methyl methacrylate using 0.145 parts of a 95:5 copolymer of methyl methacrylate and dimethyl aminomethacrylate by simple paddle stirring in a vessel. The dispersion additionally contained 0.3 parts ethylene glycol dimethacrylate as cross-linker, 0.01 parts of -methacryloxy trimethoxy silane and 0.75 parts of Claytone PS-2 (an organophilic surface modified clay supplied by EEC International Ltd, now available from Laporte). The viscosity of the composition was adjusted by the inclusion of 2.1 parts of 'Diakon' LS600 (a high molecular weight homopolymer of methyl methacrylate having a reduced viscosity of 2.5-3.0 measured on a 1% solution in chloroform). The 'Diakon' LS600 was added in solution in methyl methacrylate, the monomer being part of the total of 34 parts methyl methacrylate.

The composition was free flowing having a viscosity of 30 poise measured as a Brookfield viscometer (spindle 3, 30 rpm) but was strongly shear thinning, having a thixotropy index of 3.67.

1.6% (based on MMA) of 'Perkadox' 16 (bis(4-tert butylcyclohexyl peroxydicarbonate) and 0.8% of stearic acid was added to the dispersion. The viscosity of the dispersion was reduced slightly to 25 Poise although the thixotropy index remained essentially unchanged. This dispersion was introduced into a sink mould using an injection pressure of 1.5 bar. The filling time was 90 seconds. The sink mould was held horizontally but inverted for the polymerisation cycle. The mould half against which the show surface of sink was to be polymerised was maintained at a temperature of 80° C. with the other mould half being at 50° C. After 15 minutes curing at these temperatures the mould halves were both raised to 100° C. The reaction time to complete cure including post cure was approximately 30 minutes. A sink having a thickness of approximately 10 mm was produced.

The sink had a good surface finish and was evaluated to determine whether the filler particles had remained substantially uniformly suspended by measuring the Barcol Hardness on the top and bottom surfaces of the base of the sink (which had been polymerised with the sink mould inverted in a horizontal disposition. Values of 62 were determined for both surfaces indicating that no significant sedimentation had occurred.

The sink was tested for resistance to thermal shock cracking by a hot/cold water cycling test. The test cycle employed water at 93°±2° C. directed onto the inside base surface of the sink at a flow rate of 6 liters minute$^{-1}$ for 90 seconds, followed by a rest phase of 30 seconds, and water at 15°±2° C. for 90 seconds also at a flow rate of 6 liters minute$^{-1}$ and a rest phase of 30 seconds. Using this test method, the sink completed 2,500 cycles with no cracking of the bowl base.

The sink was then additionally tested for its damage tolerance. The damage tolerance thermal shock test involved using the same hot and cold water cycle described above, but the sink was scratched by drawing a device in which a 'Stanley Knife Blade' was protruding by 1 mm from a flat surface across the show surface of the base of the sink. A scratch 3.5 cm in length was made at the point of impingement of the water jet. The thermal cycling was continued for a further 1,000 cycles. Small crazes, about 0.5 cm long, were present at the end of the scratch but no cracking of bowl base occurred.

EXAMPLE 2

The procedure of Example 1 was repeated using 0.8 parts tripropylene glycol dimethacrylate in place of the ethylene glycol dimethacrylate. A very similar performance was achieved.

COMPARATIVE EXAMPLE A

The procedure of Example 1 was repeated except in that the Claytone was omitted and 1.08 parts of fumed silica HDK2000 (supplied by Wacker Chemie) was added. The dispersion produced had a viscosity of about 9.8 Poise at 30 rpm on Spindle 3 of the Brookfield viscometer, but showed little tendency to shear thinning. The thixotropic index was 1.12. The dispersion also showed signs of settling in the period between forming the composition in the stirred vessel and pouring it into the mould. Large areas of poor surface finish were apparent on the show surface of the sink. Barcol Hardness measurements as in Example 1 gave values of 66 on the bottom surface (the show face) and 60 on the top surface indicating considerable sedimentation during the polymerisation process.

The sink was tested for thermal shock resistance as described in Example 1. After 54 cycles a crack began to develop leading from the plughole. After 200 cycles the crack was sufficiently large to cause leakage.

COMPARATIVE EXAMPLE B

The procedure of Example 1 was repeated except that the Claytone was omitted and 2.8 parts of formed silica HDK2000 (supplied by Wacker Chemie) was added. The dispersion produced had a viscosity of 18 Poise (Spindle No. 3, 30 rpm). The surface finish was good. Barcol hardness measurements gave values of 65 on the bottom surface and 65 on the top surface indicating that negligible settlement had occurred during the polymerisation cycle using this high level of fumed silica.

The sink was tested for resistance to thermal shock cracking using the test method described in Example 1. By 100 cycles, the whole bowl base was cracked and the sink leaked water.

COMPARATIVE EXAMPLE C

The procedure of Example 1 was repeated omitting the Claytone but using a concentration of 3.8 parts of 'Diakon' LS600 to give an increased viscosity to help prevent sedimentation. The viscosity obtained (36 poise, measured on a Brookfield viscometer, spindle no. 3 at 30 rpm) was too high to give a satisfactory dispersion from the point of view of filling drums and low pressure pumping because no shear thinning was observed. Nevertheless it was sufficiently fluid to be pourable after catalyst and stearic acid was added and was polymerised as in Example 1. Measurements of Barcol Hardness gave values of 66 for the top surface and 64 for the bottom surface. The sink showed areas of very poor surface finish on the show surface. The sink was tested for resistance to thermal shock cracking using the test method described in Example 1. By 85 cycles, the whole bowl base was cracked and the sink leaked water.

EXAMPLE 3

A curable composition was made up by dispersing 63 parts by weight of alumina trihydrate having a mean particle size of 65 microns (H100 ex Showa Denko) in 34 parts of methyl methacrylate using 0.05 parts of a 95:5 copolymer of methyl methacrylate and dimethyl amino-methacrylate by simple paddle stirring in a vessel. The dispersion additionally contained 0.3 parts ethylene glycol dimethacrylate as cross-linker, 0.004 parts of -methacryloxy trimethoxy silane and 0.3 parts of Claytone PS-2. The viscosity of the composition was adjusted by the inclusion of 3.3 parts of 'Diakon' LS600.

The composition was free flowing having a viscosity of 24 Poise as measured on a Brookfield viscometer (Spindle No. 3, 30 rpm) and was moderately shear thinning. The thixotropy index was 1.75.

The composition was moulded into a sink as described in Example 1. The sink had a good surface finish with Barcol hardness readings of 61 for both showface and backface were obtained indicating no sedimentation. The sink had a similar resistance to thermal shock cracking as described in Example 1.

EXAMPLE 4

A curable composition was made up by dispersing 63 parts by weight of alumina trihydrate having a mean particle size of 45 microns (CW350 ex Sumitomo Chemical) in 34 parts of methyl methacrylate using 0.1025 parts of a 95:5 copolymer of methyl methacrylate and dimethyl aminomethacrylate by simple paddle stirring in a vessel. The dispersion additionally contained 0.3 parts by weight ethylene glycol dimethacrylate as cross-linker, 0.0082 parts by Weight of γ-methacryloxy trimethoxy silane and 0.75 parts by weight of Claytone PS-2. The viscosity of the composition was adjusted by the inclusion of 2.1 parts by weight of 'Diakon' LS600.

The composition was free flowing having a viscosity of 36 Poise as measured on a Brookfield viscometer (Spindle No. 3, 30 rpm) and was strongly shear thinning. The thixotropic index was 3.36.

The composition was moulded into a sink as described in Example 1. The sink had a good surface finish with Barcol hardness readings of 58 for both showface and backface indicating no sedimentation. The sink had a similar resistance in thermal shock cracking as described in Example 1.

EXAMPLE 5

The procedure of Example 4 was repeated using an alumina trihydrate having a mean particle size of 45 microns (CW350 ex Sumitomo Chemical). In order to confer a speckled, granite-like appearance to the product, coloured granules were blended into the dispersion. These granules are prepared by grinding coloured ATH-filled polyester composite and are commercially available as DC10 (white) and DC20 (black) from the R J Marshall Co. The mean particle size of these granules is 500 microns. 7.5 parts of DC10 (white) and 3 parts of DC20 (black) were stirred into the dispersion. The composition was free flowing having a viscosity of 65 Poise as measured on a Brookfield viscometer (spindle 4, 30 rpm) but was strongly shear thinning. The shear thinning behaviour was characterised by the thixotropy index—defined as the ratio of Brookfield viscosity readings (Spindle No. 4) at 6 rpm versus 30 rpm. For this formulation, the thixotropy index was 3.23 (viscosity readings of 210 Poise, 6 rpm and 65 Poise, 30 rpm).

1.6% by weight (based on the MMA) of Perkadox 16 and 0.8% of stearic acid was added to the dispersion. The viscosity of the dispersion reduced somewhat (25 Poise, Spindle No. 3, 30 rpm) but it maintained its shear thinning properties. The dispersion was pumped readily into a 1.5 m long countertop mould using an injection pressure of 2 bar. The mould was filled in 90 seconds. Both halves of the mould surface were held at 50° C. for the filling operation. After filling, the temperature of the mould against which the show surface of the moulding was to be polymerised was raised to 80° C. After 15 minutes polymerisation both moulds were raised to 100° C. and the polymerisation continued for a total cure time of 30 minutes. After polymerisation, a countertop having a thickness of approximately 10 mm was produced. The reaction time to complete cure including postcure was approximately 50 minutes.

The countertop had a good surface finish. The concentration of black and white granules were visually judged to be the same on the showface and backface, showing that the large filler-containing particles had remained substantially uniformly dispersed during the polymerisation cycle.

EXAMPLE 6

A series of curable compositions were prepared as described in Example 1 with the omission of 0.75 parts of Claytone PS-2 thixotrope and substitution of the following organoclays at a concentration of 0.75 parts. Claytone 40, Claytone APA, Claytone EM, Claytone AF (all available from Laporte), Perchem 44, Perchem 97, Perchem Easigel (from Akzo Chemicals). The clays were mixed into the series of curable compositions by simple stirring (without the use of high shear mixing or using a formulated clay pre-gel).

All the compositions were free flowing and viscosities were measured on a Brookfield viscometer (Spindle No. 3, 30 rpm) and shown in Table 1. The thixotropic index (as defined in Example 1) is also shown in Table 1.

All the clays gave measurable viscosity build and thixotropy.

After preparation, all the compositions were left standing in flasks for 30 minutes to assess the rate of filler sedimentation. No obvious sediment was observed for any of these compositions.

TABLE 1

| Thixotrope | Viscosity (poise) (Spindle No. 3, 30 rpm) | Thixotropic Index |
| --- | --- | --- |
| Claytone 40 | 40 | 3.25 |
| Claytone APA | 25 | 2.80 |
| Claytone EM | 17 | 1.76 |
| Claytone AF | 17 | 1.59 |
| Perchem 44 | 40 | 3.75 |
| Perchem 97 | 70 | 2.21 |
| Perchem Easigel | 10 | 2.20 |

COMPARATIVE EXAMPLE D

A curable composition was prepared as described in Example 1 with the 0.75 parts Claytone PS-2 thixotrope being replaced by a series of fumed silicas. The following fumed silicas were incorporated into the dispersion at 0.75 parts; A130, A300, A380, A200 (all available from Degussa Ltd). The clays were mixed into the curable composition by simple stirring.

All the compositions were free flowing. The viscosities were measured on a Brookfield viscometer (Spindle No. 3, 30 rpm) and shown in Table 2. The thixotropic index (as defined in Example 1) is also shown in Table 2.

All the compositions showed insignificant viscosity build. Only one fumed silica grade (A130) showed any measurable thixotropy. When the compositions were left standing for 30 minutes, all the compositions showed significant sedimentation of filler.

TABLE 2

| Thixotrope | Viscosity (poise) (Spindle No. 3, 30 rpm) | Thixotropic Index |
| --- | --- | --- |
| A130 | 12.5 | 1.6 |
| A300 | 10 | 0.8 |
| A380 | 10 | 1.1 |
| A200 | 7 | 0.8 |

COMPARATIVE EXAMPLE E

The procedure of Comparative Example D was followed to evaluate a series of coated fumed silicas incorporated into the dispersions at 0.75 parts. The series consisted of the grades R812, R972, R202, R805, R974 (all available from Degussa).

All the compositions were free flowing and the viscosities and thixotropy indices shown in Table 3.

All the compositions showed insignificant viscosity build. Only one fumed silica grade (R812) showed any measurable thixotropy. When the compositions were left standing for 30 minutes, all the compositions showed significant sedimentation of the filler.

TABLE 3

| Thixotrope | Viscosity (poise) (Spindle No. 3, 30 rpm) | Thixotropic Index |
| --- | --- | --- |
| R812 | 11 | 1.82 |
| R972 | 7 | 0.71 |
| R202 | 6.5 | 0.85 |
| R805 | 6 | 1.17 |
| R974 | 6 | 0.67 |

EXAMPLE 7

A curable composition was prepared by dispersing 72 parts by weight of cristobalite silica having a mean particle size of 8 μm in 26.2 parts of methyl methacrylate using 0.72 parts of a 95:5 copolymer of methyl methacrylate and dimethyl amino methacrylate by simple paddle stirring in a vessel. The dispersion additionally contained 0.3 parts of ethylene glycol dimethacrylate as cross-linker, 0.07 parts of γmethacryloxy trimethoxy silane and 0.125 parts of Claytone PS-2. The viscosity of the composition was adjusted by the inclusion of 1.0 parts of 'Diakon' LS600. 2 parts of a silverised mica of mean particle size 800 μm known as Briteflake Silver BS30T (ex Microfine Minerals) and 0.3 parts of a pigment masterbatch were then added to effect a reflective, stone-like appearance.

The composition was free flowing having a viscosity of 20 Poise as measured on a Brookfield viscometer (Spindle No. 3, 30 rpm) and was moderately shear thinning. The thixotropic index was 1.60.

The dispersion was initiated with Perkadox 16 and stearic acid as described in Example 1. The dispersion was pumped readily into a 1.2 m long bath mould using an injection pressure of 3.5 bar. The mould filled in approximately 200 seconds After polymerisation, a moulding approximately 8 mm thick was produced. The reaction time to complete cure was 60 minutes including postcure.

The bath had a reflective, stone-like finish. The distribution of the reflective particles was uniform across the showface of the bath. The concentration of the reflective particles was visually similar on the showface and backface, demonstrating an absence of sedimentation effects.

COMPARATIVE EXAMPLE F

A curable composition was prepared as in Example 7 but with the omission of Claytone PS-2 thixotrope.

The dispersion was free flowing with a viscosity of 15 Poise as measured on a Brookfield viscometer (Spindle No. 3, 30 rpm) and showed negligible shear thinning. Bath moulding was carried out using the process described in Example 7.

The bath had a reflective stone-like finish but had an uneven distribution of reflective particles across the showface. Some areas near the fill position (the mould entry point for the dispersion) showed considerable sedimentation of the reflective particles giving an uneven appearance. The concentration of reflective particles on the backface was considerably lower than the showface, showing that sedimentation had occurred.

We claim:

1. A fluid, highly filled, curable composition comprising an organic liquid which is polymerisable to form a solid polymer without the formation of elimination products and in which methyl methacrylate comprises at least 15% by weight of the organic liquid, 20 to 70% by volume of finely divided inorganic filler particles, at least 1% by volume of these being in the form of particles having a diameter of at least 30 microns, with the proviso that when the maximum particle size of such particles is 150 microns they are present at a concentration of between 20% and 70% by volume and when particles are present having a size of greater than 150 micron they are present at a concentration of at least 1% but preferably not exceeding 30% by volume and from 0.05 to 5.0% by weight of the total composition, of an organophilic, surface modified clay having a particle surface area of at least 100 $m^2/g$.

2. A fluid, highly filled, curable composition according to claim 1 containing between 0.1 and 2.0% by weight of the surface modified clay.

3. A fluid, highly filled, curable composition according to either of claims 1 or 2 in which the clay has a surface area greater than 400 $m^2/g$.

4. A fluid, highly filled, curable composition according to any one of the preceding claims in which methyl methacrylate comprises a major proportion of the organic liquid.

5. A fluid, highly filled, curable composition according to any one of the preceding claims in which the organic liquid includes components which result in the final matrix polymer being cross-linked or highly branched after the composition has been cured.

6. A fluid curable composition according to any one of the preceding claims containing a polymeric dispersant containing (a) at least one chain-like component of molecular weight at least 500 which is solvated by the polymerisable liquid and is also solvated by, or is compatible with, the oligomeric or polymeric products which result throughout the course of curing the composition and (b) one or more groupings which are capable of associating with and effecting anchoring to the particles of the inorganic filler.

7. A fluid curable composition according to any one of the preceding claims having a viscosity measured on a Brookfield viscometer using Spindle No. 3 at 30 rpm of between 5 and 250 Poise.

8. A fluid curable composition according to claim 7 in which the thixotropy index is at least 1.1.

9. A fluid curable composition according to claim 8 in which the thixotropy index is at least 2.

10. A moulded article prepared from a curable composition according to any preceding claim in which the filler particles are uniformly dispersed through the thickness of the moulded article.

* * * * *